May 22, 1945.   A. SCHÜTTE   2,376,727
DEVICE FOR MAKING SCREW THREADS
Filed Nov. 28, 1940   2 Sheets-Sheet 1

Inventor:
Albert Schütte
BY
Richards & Geier
ATTORNEYS

Patented May 22, 1945

2,376,727

UNITED STATES PATENT OFFICE 2,376,727

DEVICE FOR MAKING SCREW THREADS

Albert Schütte, Dessau, Anhalt, Germany;
vested in the Alien Property Custodian

Application November 28, 1940, Serial No. 367,509
In Germany September 21, 1939

4 Claims. (Cl. 80—6)

This invention relates to a device for making screw threads.

The manufacture of good screw threads in tough steels of high quality presents great difficulties even at the present time. The bottom of the thread grooves is often torn or damaged during the cutting of the screw threads and then the lack of smoothness of the thread surface subjects the threads to an increased danger of corrosion.

Prior art devices for the rolling of screw threads operate satisfactorily only when the material which is to be worked on is comparatively soft and does not exceed a certain degree of hardness. Then, a cylindrical blank may be subjected to a rolling operation for the purpose of cutting screw threads therein and a preliminary cutting of the blank prior to the rolling operation is not necessary. However, cylindrical blanks consisting of high quality steels of great hardness cannot be subjected to a rolling operation for the purpose of making screw threads therein, without a preliminary cutting or milling of the screw threads.

The rolling of screw threads is often carried out by a plurality of rollers mounted in a casing. These known devices do not operate with that degree of precision which is required from tools subjecting threads cut in materials of an especially high quality by a preliminary operation, to final rolling and calibrating operations.

An object of the present invention is the provision of a tool which is so constructed that its rollers used for the rolling of screw threads, are guided therein with the greatest amount of precision.

Another object is the provision of a thread rolling tool wherein the position of the rollers can be so adjusted that the treating channel formed by the rollers for the workpiece can be conical as well as cylindrical.

A further object is the provision of a single thread rolling tool which can be used for making threads of different diameters.

A still further object is the provision of a thread rolling tool having roller-supporting axes, the angles of inclination of which are made adjustable, thereby facilitating the introduction of the workpiece between the rollers and providing for an adjustment of the wear upon the ribs of the rollers.

An additional object of the present invention is the provision of a tool, the rollers of which are yieldably supported in axial and radial directions, thereby facilitating the insertion of the front ribs of the rollers into the first turn of the previously cut screw threads of the workpiece.

Yet another object of the present invention is the provision of a thread rolling tool, the rollers of which may be uniformly adjusted in the radial direction.

Another object is the provision of a thread rolling tool, the various parts of which are so constructed that the introduction of the first turn of a screw thread in the workpiece over the first ribs of the rollers is considerably facilitated and the danger of damage to the screw threads or to the ribs of the rollers resulting from an incorrect insertion of the workpiece, is effectively avoided.

A further object is the provision of a thread treating tool which can operate effectively even in case the return movement of the various workpiece-treating elements does not start at the correct instant.

A still further object of the present invention is the provision of a tool for the final treatment of previously cut screw threads, which will make the bottom and side surfaces of the threads of exceptional smoothness and of a permanent high caliber.

Yet another object of the present invention is the provision of a thread-making tool which can be utilized most economically for the mass production of screw threads and by means of which it is possible to provide in very large quantities workpieces having screw threads which are all uniform and conform to the standard requirements.

An additional object of the present invention is the provision of a single tool which may be used for finishing screw threads which have been previously cut in hard and tough steels, and which can be also utilized for the making of screw threads from cylindrical blanks in a single operation, provided that such blanks consist of a material which is not too hard.

Other objects of the present invention will become apparent in the course of the following specification.

In accomplishing the objects of the present invention, it was found desirable to provide rollers used for the treatment of the screw threads, which are mounted adjustably in the radial direction within a frame work in such manner that their positions can be influenced by adjusting means connected with the framework so as to cause the axes of the rollers to extend not only parallel to each other, but also at the same angle of inclination to each other, whereby the treating channel for the workpiece which is formed by the rollers, can be made either cylindrical or conical.

In accordance with a preferred embodiment of the inventive idea, the rollers are mounted upon a plurality of discs which are yieldable in the radial direction and which are supported in a framework with the aid of wedge-like rings, a separate ring being provided for each disc.

Nuts or similar elements screwed upon the frame work are used for adjusting the wedge-like rings and, consequently, the mounting of the rollers.

An advantage of this construction is that it makes it possible to adjust the positions of all the rollers uniformly in the radial direction without it being necessary to shift each roller separately since such separate shifting can easily result in an incorrect or insufficiently exact adjustment.

Furthermore, in accordance with a preferred embodiment of the inventive idea, the round framework of the tool is yieldably mounted by means of pressure springs in relation to the chucking piece of the tool.

Due to this yieldable mounting, the insertion of the first turn of the previously cut screw threads over the first ribs of the rollers is considerably facilitated and any danger that the threads or ribs may be damaged by incorrect insertion is effectively avoided.

According to the preferred embodiment of the inventive idea, a coupling is provided between the casing receiving the rollers and the chuck rod of the tool, this coupling interrupting the operation as soon as the previously cut screw threads are completely inserted into the tool.

The provision of this coupling has the advantage that the tool operates properly even when the machine begins its return movement not at that moment in which the last turn of the previously cut thread is moved between the rollers. Consequently, the coupling eliminates the danger that the workpiece or the tool may be damaged or destroyed by the late switching off of the rotary movement.

The invention will appear more clearly from the following detailed description, when taken in connection with the accompanying drawings, showing, by way of example, a preferred embodiment of the inventive idea.

Figure 2:
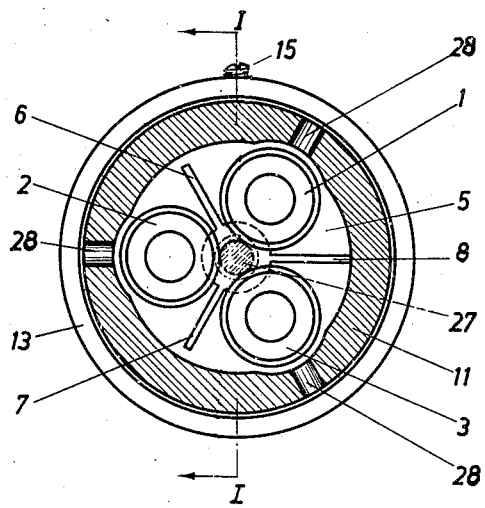
Figure 2 is a section along the line II—II of Figure 1.
Figure 3:
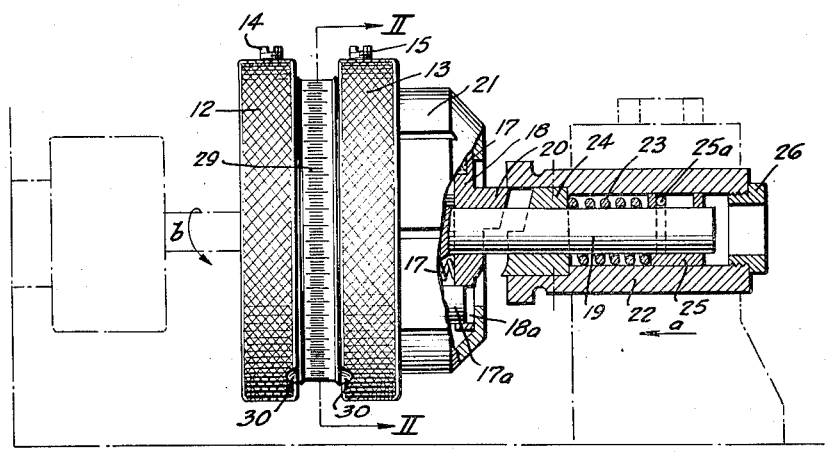
Figure 3 shows the tool partly in side elevation and partly in section.

The tool shown in the drawing includes rollers 1, 2 and 3, the outer surfaces of which are provided with ribs used for the cutting or polishing of screw threads. The rollers 1, 2 and 3 are rotatably mounted in discs 4 and 5 in such manner that the rollers do not touch each other (Fig. 2).

Each of the discs 4 and 5 is provided with radial slots 6, 7 and 8 extending between the roller mountings. The slots 6 and 7 do not extend to the periphery of the disc, while the slot 8 which is in communication with the slots 6 and 7, extends along the entire radius of the disc. Due to this arrangement, each of the discs constitutes a resilient support for the rollers.

The disc 4 is in contact with a wedge-shaped metal ring 9, while a similar metal ring 10 is in contact with a disc 5. The discs 4 and 5 are mounted in a frame work 11 which is closed on both sides by threaded caps 12 and 13.

The caps 12 and 13 carry screws 14 and 15, respectively, which press against the frame work 11 and hold the caps 12 and 13 in the desired position upon the framework.

The outer surfaces of the wedge-shaped rings 9 and 10 are in engagement with the inner surfaces of the threaded caps 12 and 13, respectively. By unscrewing the caps 12 and 13 after the screws 14 and 15 have been unscrewed, it is possible to shift the rings 9 and 10 in the direction of the roller axes.

Depending upon the direction of the movement of the wedge-shaped rings 9 and 10, the discs 4 and 5 are either compressed or spread out, since the provision of the slots 6, 7 and 8 makes these discs resilient, and thus, the relative positions of the rollers 1, 2 and 3 carried by these discs are changed. The tapers on the rings 9 and 10 are low to prevent damage to the rings. The tapers of the rings 9 and 10 should be sufficiently great to allow the wedge-shaped rings to be retracted by the resiliency of the discs 4 and 5 when the caps 12 and 13 are unscrewed.

The cover 13 is connected or integral with a support 16 for the pressure springs 17, said springs being situated in recesses formed in the support 16. The outer ends of the springs 17 engage a plate 18 which is firmly connected with a coupling element 20. Thus, the spring means 17 are situated between the head of the device and the plate 18 which is supported by a screw cap 21. It is evident that the spring means 17 permit relative axial movement between support 16 and plate 18; however, relative rotative movement between these members must be prevented. Accordingly, a pin 17a is provided, said pin projecting from support 16 and slidably penetrating a bore 18a in plate 18. The pin 17a comprises a torque transmitting means.

The cover 13 is also connected with an inner shaft 19 which belongs to the chucking portion of the tool. The shaft 19 extends through the coupling element 20 and serves as a head support.

The screw cap 21 which is screwed upon the support 16, is used to provide a resilient connection between the plate 18 with the coupling element 20 on the one hand, and the threaded cover 13 with the shaft 19 as well as all the parts of the roller support, on the other hand.

A sleeve 22 is used for the chucking of the tool in a tool machine (not shown). The sleeve 22 encloses the shaft 19 and is separated from the shaft by a spring 23. The sleeve 22 is firmly connected with the second coupling element 24 which cooperates with the coupling element 20 and which at the same time serves as a support for the coil spring 23.

The second support for the spring 23 is constituted by a ring 25 which is mounted upon an end of the shaft 19 and which is prevented from turning relatively to this shaft by means of a pin 25a. The pin 25a which slides in a slot in the ring 25 is used to rotate the ring 25, in the direction of the arrow b when the coupling 20, 24 is out of engagement.

A nut 26 serves as a support for the spring-supporting ring 25 when the coupling 20, 24 is engaged. Then the nut 26 serves to relieve the pin 25a which would otherwise receive the entire force of the spring 23.

Figure 1:
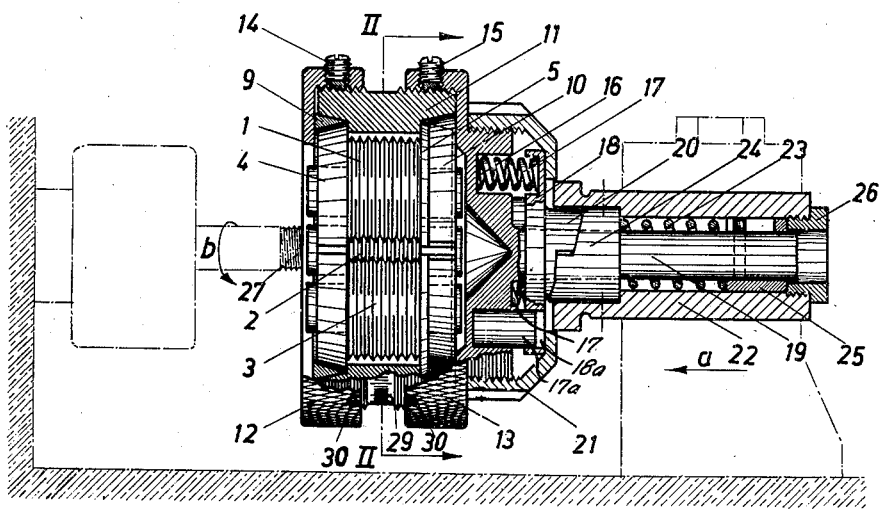
Figure 1 shows in section a tool constructed in accordance with the principles of the present invention, the section being taken along the line I—I of Figure 2.

In the position shown in Figure 1, the coupling 20, 24 which is situated between the sleeve 22 and the remaining parts of the device, is shown in the engaged position, namely, the coupling elements 20 and 24 are in engagement with each other, so that there is a rigid connection between the sleeve 22 and the casing carrying the rollers 1, 2 and 3 and constituted by the framework 11 and the caps 12 and 13.

If the casing is pulled away from the sleeve 22, against the action of the compression spring 23, the shaft 19 will slide relatively to the sleeve 22; the coupling elements 20, 24 will move away from each other and will be disengaged finally. As soon as the coupling 20, 24 is disengaged, the roller casing 11 to 13 will be rotatable relatively to the sleeve 22.

If, on the other hand, the casing 11 to 13 is pressed in the opposite direction toward the sleeve 22, then after overcoming the pressure of the springs 17 it will bear elastically toward the sleeve 22.

Consequently, the casing 11 to 13 carrying the rollers 1, 2 and 3, is resiliently supported in both directions as far as its longitudinal axis is concerned in relation to the sleeve 22, as soon as a certain force has been overcome. The casing can be rotated in relation to the sleeve 22 when the coupling elements 20 and 24 are brought out of engagement.

In operation, the sleeve 22 of the tool is held firmly within the revolving head of a lathe, the tool support of an automatic or the support of a turning machine (not shown).

A workpiece 27 (Fig. 1) consisting for instance, of a screw, the threads of which have been previously cut in a preliminary operation, is firmly held in a suitable support of the machine.

During the operation the tool receives a feed movement in the direction of an arrow $a$, the extent of this movement corresponding to the length and the pitch of the screw threads which are to be finally treated by the tool. At the same time, the workpiece 27 is rotated in the direction of the arrow $b$.

The casing 11 to 13 containing the rollers is moved slowly forward while the workpiece 27 is rotated. As soon as they meet, the casing will first yield slightly due to the provision of the springs 17, before the rollers 1, 2 and 3 engage the workpiece and complete the treatment of the first turn of the screw threads.

After the screw threads of the workpiece have been rolled to a predetermined length, the tool is moved in the opposite direction and, at the same time, the workpiece is caused to rotate in the opposite direction. Then the workpiece 27 is withdrawn from its position between the rollers 1, 2 and 3.

During the rolling process, a liquid which serves for the cooling lubrication of the tool and workpiece, flows through the channels 28 in the framework 11.

The coupling 20, 24 situated between the sleeve 22 and the casing 11 to 13 is used to secure the device against breakage or damage in case the switching device (not shown) causing the return movement of the workpiece fails to operate properly or in case of lack of attention on the part of the operator.

It may happen, for instance, that at the time when the screw threads have been rolled to a predetermined length, the return movement of the workpiece does not start on time, either due to lack of attention on the part of the operator, or through breakage of a part of the automatic lathe. In that case the tool carrier of the machine which holds the casing 11 to 13, remains immovable at the end of the previously set feed movement. However, the workpiece 27 with its previously cut screw threads would continue its rotation and would be screwed further and further into the tool casing, attempting to draw it away from the tool carrier of the machine and toward the workpiece holder.

In that case the safety coupling 20, 24 will prevent the damage. The force will be transmitted to the spring means 23, and the bolt 19 will slide in the sleeve 22, so that the coupling elements 20, 24 will move away from each other and finally, will be brought out of engagement. Thus the spring 23 is compressed when the coupling 20, 24 is disengaged. Since the tool casing 11 to 13 is now in firm engagement with the workpiece by means of the rollers 1, 2 and 3 which press against the screw threads of the workpiece, the casing will begin to rotate along with the workpiece 27 as soon as the coupling 20, 24 is disengaged. This rotation continues until the workpiece begins its return movement and is screwed out of its position between the rollers 1, 2 and 3.

As already stated, the position of the rollers 1, 2 and 3 relatively to each other is adjusted by loosening the screws 14 and 15 and turning the screw caps 12 and 13. This changes the position of the wedge-like rings 9 and 10 in relation to the discs 4 and 5 and to the framework 11. Since the discs 4 and 5 are resilient due to the provision of the slots 6, 7 and 8, the three rollers 1, 2 and 3 are moved closer to each other or away from each other by a change in the position of the rings 9 and 10.

In order to enable the operator to determine conveniently the position of the rollers 1, 2 and 3, the outer periphery of the framework 11 is provided with a scale 29 and the screw caps 12 and 13 carry arrows or pointers 30. The positions of the arrows 30 in relation to the scale 29 and in relation to each other make its possible to determine the position of the rollers 1, 2 and 3. By these means it is also possible to cause the rollers to extend conically, should this appear to be advisable when treating certain workpieces.

It is apparent that the specific illustrations shown above have been given by way of illustration and not by way of limitation and that the structures above described are subject to wide variation and modification, without departing from the scope or intent of the present invention; all of such variations and modifications are to be included within the scope of the present invention.

What is claimed is:

1. A device for making screw threads, comprising a plurality of ribbed rollers, means rotatably supporting one end of each of said rollers, whereby a treating channel for a workpiece is formed between said roller peripheries, a disc yieldable in radial directions for supporting the other end of each of said rollers, a framework, and means connected with said framework and engaging said last named supporting means to adjust the relative positions of said rollers in radial directions and to vary said positions from ones wherein said rollers are parallel to each other to ones wherein said rollers are inclined at the same angle to each other, and vice versa, whereby the form of said treating channel is changed from a cylindrical one to a conical one, and vice versa.

2. A device for making screw threads, comprising a plurality of ribbed rollers, a plurality of discs yieldable in radial directions and rotatably supporting each of said rollers, whereby a treating channel for a workpiece is formed between said rollers, a framework for said discs, wedge-like rings engaging a separate disc, and caps screwed upon said framework and engaging said wedge-like rings, whereby said wedge-like rings and the discs supporting said rollers are adjusted by a turning of said caps.

3. A device for making screw threads, comprising a plurality of ribbed rollers, means rotatably supporting each of said rollers, whereby a treating channel for a workpiece is formed between said rollers, a framework, means connected with said framework and engaging said supporting means to adjust the relative positions of said rollers in a radial direction, means for the chucking of the device in a tool machine, a coupling consisting of two coupling elements, one of said coupling elements being connected with said chucking means, means connecting the other one of said coupling elements with said roller adjustment means, spring means yieldingly urging said framework and said other coupling element apart, and a second spring means yieldingly urging said other coupling element into engaging relation with said first named coupling element through the intermediary of said first spring means.

4. A device for making screw threads, comprising a plurality of ribbed rollers, means rotatably supporting each of said rollers, whereby a treating channel for a workpiece is formed between said rollers, a framework, means connected with said framework and engaging said supporting means to adjust the relative positions of said rollers in radial directions, a shaft carried by said adjusting means, means for slidably supporting said shaft in a machine tool to thereby support said frame work, rollers and adjusting means for bodily movement, a first spring means for yieldingly urging said bodily supported members toward the shaft supporting means, a coupling having two engageable elements, a second spring means for yieldingly urging one of said elements into engagement with the other of said elements, torque transmitting means connecting said bodily supported members with said urged coupling element, and stop means carried by said adjusting means to limit the travel of said urged coupling element toward said other coupling element.

ALBERT SCHÜTTE.